United States Patent

Ichihashi et al.

[11] Patent Number: 6,000,797
[45] Date of Patent: Dec. 14, 1999

[54] SPECTACLES

[75] Inventors: Toshifumi Ichihashi, Pearl In Fuji 103, 26-7, Matsukaze-cho, Hiratsuka-shi, Kanagawa-ken, Japan; Kurumi Ichihashi, Hiratsuka, Japan

[73] Assignee: Toshifumi Ichihashi, Hiratsuka, Japan

[21] Appl. No.: 09/236,598

[22] Filed: Jan. 26, 1999

[30] Foreign Application Priority Data

Oct. 8, 1998 [JP] Japan .................................. 10-286535

[51] Int. Cl.$^6$ ....................................................... G02C 5/12
[52] U.S. Cl. ........................ 351/156; 351/113; 351/118; 351/137
[58] Field of Search ................................. 351/111, 113, 351/114, 118, 136, 137

[56] References Cited

U.S. PATENT DOCUMENTS 4,932,771  6/1990  Nowottny .................................. 351/113

Primary Examiner—Huy Mai
Attorney, Agent, or Firm—James Creighton Wray; Meera P. Narasimhan

[57] ABSTRACT

The invention is to embed a stretching spring member $1a$, a compression spring member $1b$ and a supporting member 2 having a large friction coefficient as a nose pad into spectacles, thereby to constitute a displacement prevention mechanism K for preventing displacement of the spectacles. The spectacle to be put on a face comprising: a lens L; an elongated member 1 for hooking the lens onto an ear; the supporting pad 2 for maintaining a distance from the lens to an eye at an appropriate value; the stretching spring member for generating a tensile force Fa; and the compression spring member for generating a compressible force Fb, wherein: the stretching spring member and the compression spring member are built-in into the spectacle so that the tensile force Fa and the compressible force Fb, the latter of which is applied from the lens through the supporting pad onto the face, work cooperatively in a back-and-forth direction when the spectacle is put on; and the supporting pad for contacting with a nose on a sidewall is formed of a soft-type material having a large friction coefficient to constitute the displacement prevention mechanism, thereby enabling to prevent the spectacle from displacing out of in front of the eye.

6 Claims, 3 Drawing Sheets

(PRIOR ART)

SPECTACLES

BACKGROUND OF THE INVENTION

1. Field of the Invention

The present invention relates to spectacles for use in remedy of visual acuity, in protection of eyes, in decorating fashion of face etc. which are to be used being hung on ears and, more particularly, to those which are equipped with a displacement preventive mechanism.

2. Brief Description of the Prior Art

FIG. 2 is a perspective view showing a conventional pair of rimless spectacles. FIG. 3A-1 to 3A-4 is a side view showing various conventional components for use in spectacles. FIG. 3B-1 to 3B-4 is front, rear and side views showing another conventional pairs of spectacles having rims.

As can be seen from FIGS. 2 and 3A-1 to 3A-4, the conventional pair of the rimless spectacles have in general a schematic constitution composed of various components such as a pair of lens L, namely left and right, a pair of temples 1 having each temple end 7 to be hooked on an ear which connect each opposite end through a hinge 5 to one of the lens L, a bridge 4 for bridging both to each other, a pair of supporting members 2 for constituting a pair of nose pads etc.

As shown in FIGS. 3A-1 to 3A-4 and 3B-1 to 3b-4, the conventional pair of spectacles having rims have in general another schematic constitution composed of the various components such as the lens L, the temples 1 having each temple end 7 to be hooked on the ear which connect each opposite end through the hinge 5 to one of the rims 3 for enclosing the lens L, the bridge 4 for bridging both rims 3 to each other, each of the supporting members 2 for constituting each nose pad which is formed of a pad box 9, a pad core 10 and a pad foot 12, a place bar 11 optionally equipped for reinforcing the spectacles either mechanically or fashionably, a core bar 6 for penetrating the temple 1 and the temple end 7 thereby to strengthen them, an ornament 8 and so on.

In the constitutions mentioned above, the conventional spectacles in general do not have any mechanism for preventing displacement of the spectacles from a loaded position.

In the conventional examples mentioned above, the spectacles are supported by means of grasping a human head through the temples 1 for clipping sidewalls of the head as well as through the temple ends 7 to be hooked on rear portions of the ears, and by means of riding on the sidewalls of the nose through the supporting pads 2. When a human body is playing any sports, however, there arises a problem that a sweating action of a face skin whereon the spectacles contact turns wet and slippy so that rocking motion and vibration during the movement induce the displacement of the spectacles from an originally located position even though a falling-down of the spectacles out of the face does not take place.

On the other hand, a still another conventional example wherein extensible members formed of, for instance, rubber bands etc. are mounted for use in supporting the spectacles has been experienced. The latter example proposes, however, another problem that it hurts the fashionability of the spectacles.

SUMMARY OF THE INVENTION

The present invention is carried out in circumstances mentioned above. An object of the present invention is to provide a displacement preventable spectacle wherein a built-in displacement prevention mechanism is constituted by employing a stretching spring member, a compression spring member and a supporting member having a large friction coefficient which acts as a nose pad.

The present invention solves the problems mentioned above by constituting components as follows:

(1) A spectacle to be put on in front of an eye on a face, comprising:

a lens;

an elongated member for hooking the lens through an temple end on an ear which is located on a sidewall of a head;

a supporting pad for maintaining a distance from the lens to the eye at an appropriate value;

a stretching spring member for generating a tensile force; and a compression spring member for generating a compressible force, wherein:

aforesaid stretching spring member and aforesaid compression spring member are built-in into the spectacle so that the tensile force and the compressible force, the latter of which is applied from the lens through the supporting pads onto the face, work cooperatively in a back-and-forth direction when the spectacle is put on; and the supporting pad for contacting with a nose on a sidewall is formed of a soft-type material having a large friction coefficient to constitute a displacement prevention mechanism, thereby enabling to prevent the spectacle from displacing out of in front of the eye.

(2) The spectacle constituted as (1), wherein:

aforesaid stretching spring member is formed of a constituent of a group consisting of a coil spring member and a leaf spring member; and is inserted to be controllably mounted corresponding to a specified tensile force into a certain intermediate position from the lens to the temple end of the elongated member for hooking the lens onto the ear located on the sidewall of the head.

(3) The spectacle constituted as (1), wherein:

aforesaid compression spring member is formed of one constituent of the group consisting of the coil spring member and the leaf spring member; and is inserted between aforesaid lens and aforesaid supporting pad so that a distance from the sidewall of the nose located on a center of the face to the lens can be maintained at an adequate value.

(4) A spectacle to be put on in front of an eye on a face, comprising:

a lens;

a rim for enclosing the lens;

an elongated member for hooking the rim through a temple end onto an ear which is located on a sidewall of a head;

a supporting pad for maintaining a distance from the lens enclosed in the rim to the eye at an appropriate value;

a stretching spring member for generating a tensile force; and a compression spring member for generating a compressible force, wherein:

aforesaid stretching spring member and aforesaid compression spring member are built-in into the spectacle so that the tensile force and the compressible force, the latter of which is applied from the lens through the supporting pad onto the face, work cooperatively in a back-and-forth direction when the spectacle is put on; and aforesaid supporting pad for contacting with a nose on a sidewall is formed of a soft-type material having a large friction coefficient to constitute a displacement prevention mechanism, thereby enabling to prevent the spectacle from displacing out of in front of the eye.

(5) The spectacle constituted as (4), wherein:

aforesaid stretching spring member is formed of a constituent of a group consisting of a coil spring member and a leaf spring member; and is inserted to be controllably built-in corresponding to a specified tensile force into a certain intermediate position from the rim to the temple end of the elongated member which hooks the rim enclosing the lens on the ear located on the sidewall of the head.

(6) The spectacle constituted as (4), wherein:

aforesaid compression spring member is formed of the constituent of the group consisting of the coil spring member and the leaf spring member; and is inserted between aforesaid rim and aforesaid supporting pad so that a distance from the sidewall of the nose located on a center of the face to the rim can be maintained at an adequate value.

BRIEF DESCRIPTION OF THE DRAWINGS

FIG. 3B-1 to 3B-4 (PRIOR ART) is front, rear and side views showing another conventional constitution of spectacles having rims.

DETAILED DESCRIPTION OF THE PREFERRED EMBODIMENTS

Hereinafter are described the preferred embodiments according to the present invention with reference to the drawings of FIGS. 1A, 1B and 1C. The best modes contemplated by the inventor during carrying out the present invention into practice will be also described corresponding to the preferred embodiments.

Figure 1A:
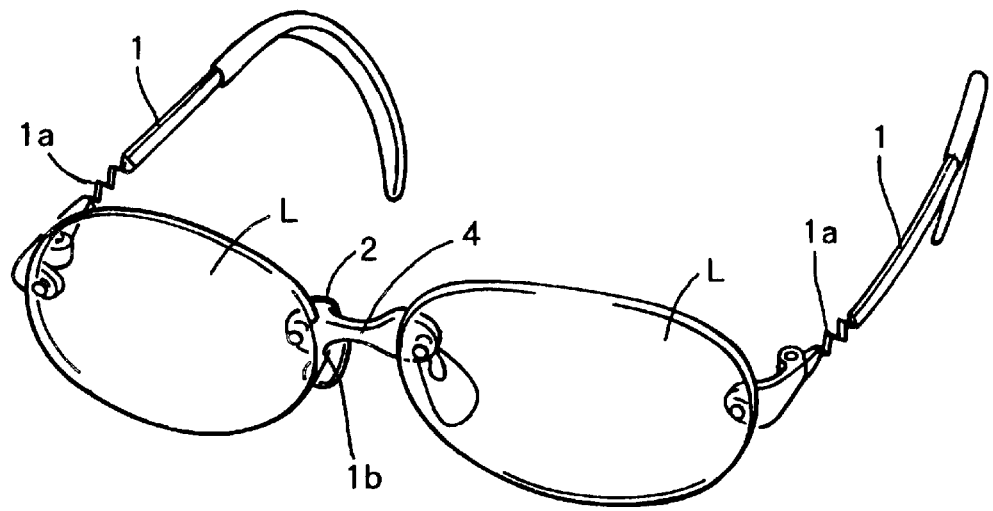
FIG. 1A is a perspective view showing an embodiment of spectacles according to the present invention.
Figure 1B:
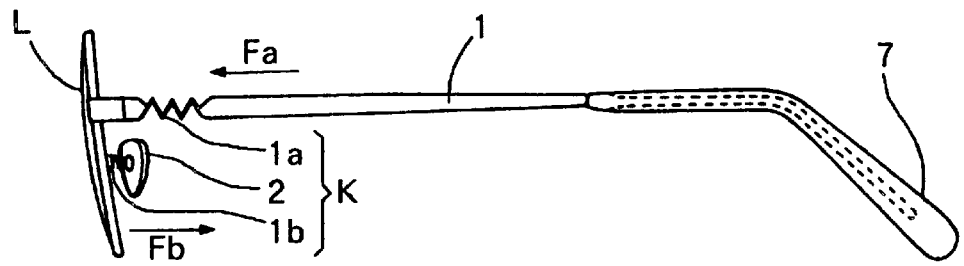
FIG. 1B is a side view of the spectacles shown in FIG. 1A.

Herein FIG. 1A is a perspective view showing an embodiment of rimless spectacles according to the present invention and FIG. 1B is a side view of the embodiment shown in FIG. 1A.

In FIGS. 1A and 1B, an alphabetic character L stands for a lens, a numeric sign 1 stands for an elongated member which is so called a "temple", 2 stands for a supporting pad for supporting the lens L on a sidewall of a nose which is therefore called a "nose pad" and 4 stands for a bridge for bridging both lens L with each other. A numeric sign 1a stands for a stretching spring member for generating a tensile force Fa while 1b stands for a compression spring members 1b for generating a compressible force Fb.

In the embodiment according to the present invention, the stretching spring member 1a is formed either of a coil spring member or of a leaf spring member first, then controlled in strength by adjusting its length correspondingly to the specified force strength Fa and inserted between a hinge 5 and the elongated member 1 for hooking the lens L through the temple end 7. The compression spring member 1b of which force strength is constituted suitably to the specified compressible force Fb either of the coil spring or of the leaf spring is inserted between the lens L and the supporting pad 2. Further, the supporting pad 2 for contacting the nose on the sidewall is fabricated by a soft-type material having a large friction coefficient such as an urethane polymer, which constitutes a displacement prevention mechanism K for preventing the spectacles from displacing along the face out of in front of the eyes by aids of two spring members 1a and 1b mentioned above.

Operations and functions of the present embodiments are described relating to the constitution mentioned above.

When users put on the spectacles according to the present embodiment, the spectacles themselves do not induce any displacement out of an initial position that the spectacle is originally disposed on and can maintain a stable status even when the users encounter rocking or vibrational motions accompanying with athletics, sports etc. and even when skins of the users' faces wetted with sweat turn slippy because the spectacles are equipped with the displacement prevention mechanism K composed of the stretching spring member 1a which applies the tensile force Fa from the lens L through the elongated member 1 onto the ear, the compression spring member 1b which applies the compressible force Fb from the lens L through the nose pad 2 onto the face and the supporting pad 2 having the large friction coefficient to contact firmly with the nose on the sidewall.

Herein the stretching spring member 1a might be manufactured independently and separately as the coil spring member to be inserted into the appropriate position of the elongated member 1 utilizing a connection technology such as welding or brazing. On the contrary, the stretching spring member 1a might be formed of a sort of spring steel member monolithically with the elongated member 1 for constituting a temple 1 and a temple end 7, only a corresponding portion of which for corresponding to the spring member 1a might be initially manufactured as a flat-shaped plate having from 0.1 to 0.3 millimeters in thickness and then to be transformed later into a spring-shape member, for instance, by press.

Further, the stretching spring member 1a and compression spring member 1b are preferably formed of any materials having spring functions, namely so long as they are employable as elastic materials such as the spring steels, stainless steel, nickel silver etc.

On the other hand, polyurethane compounds and the like having large friction coefficient of which extent in hardness is controllable by varying their compositions are preferable to be employed as the materials for use in the supporting pad 2 serving as the nose pad.

In addition, the stretching spring member 1a does not need any large values in displacement but only need to have a shape to provide an appropriate tensile force Fa. As a result, shape, dimension, plate thickness and fashionability of the stretching spring member 1a can be decided correspondingly to the conditions which are desired by the spectacle users.

Incidentally, the "leaf spring member" which is defined herein differs from that having a socially acceptable concept in general and means the "spring member having originally a leaf shape" which is then wrought by stretching, compressing and bending so as to have the spring function.

The supporting pad 2 according to the present embodiment is formed integrally with the bridge 4. However, they might be formed independently separated.

The present invention is also applicable even to the spectacle having the rim and can bring about the same effectiveness as that in the rimless spectacle.

Figure 1C:
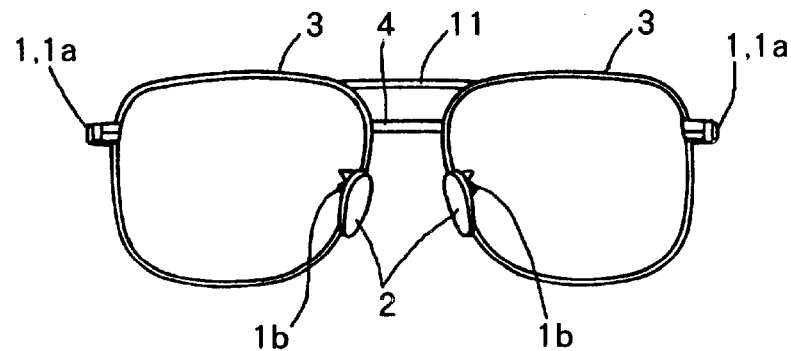
FIG. 1C is an inside view of another embodiment according to the present invention for illustrating a schematic constitution.
Figure 2:
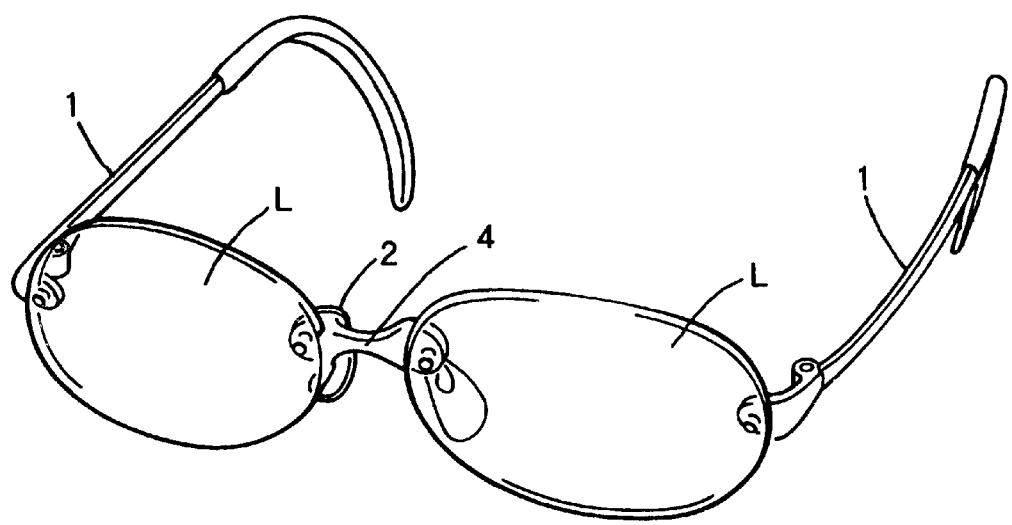
FIG. 2 (PRIOR ART) is a perspective view showing a conventional constitution of rimless spectacles.
Figures 1, 3A:
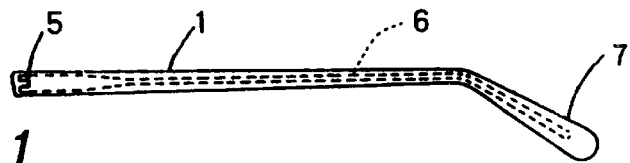
FIG. 3A-1 to 3A-4 (PRIOR ART) is a side view showing components of conventional spectacles.
Figures 2, 3A:
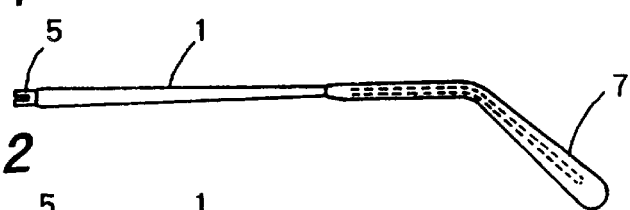
Figures 3, 3A:
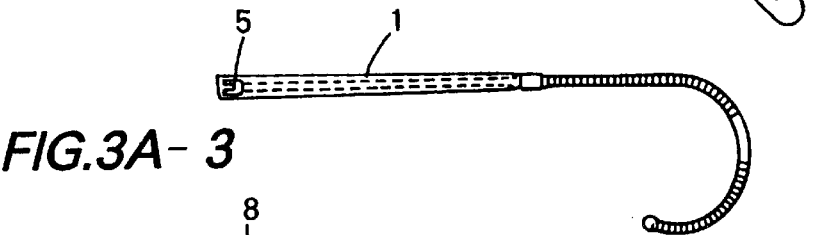
Figures 3, 3A, 4:
Figures 1, 3B:
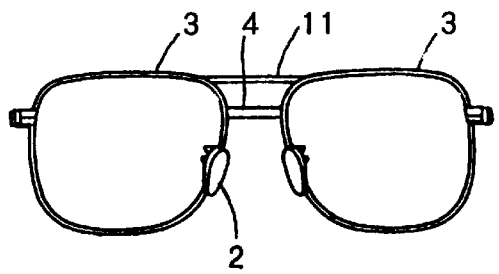
Figures 3, 3B:
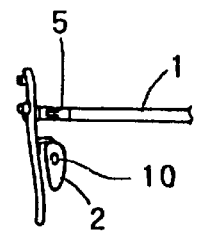
Figures 2, 3B:
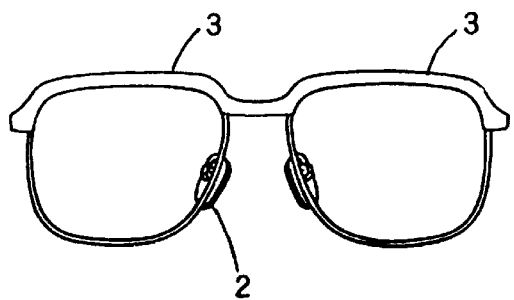
Figures 3, 3B, 4:
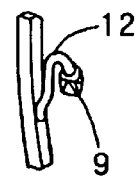

FIG. 1C is an inside view of another embodiment according to the present invention for illustrating a schematic constitution of spectacles having rims compared with previous embodiment which shows the rimless spectacles. All of numeric signs and alphabetic characters shown in FIG. 1C stand for the same components not only as those shown in FIGS. 1A and 1B but also as those shown in FIGS. 2, 3A-1 to 3A-4 and 3B-1 to 3b-4.

Herein 3 stands for a rim (otherwise referred to as a "frame") for enclosing a lens L, one sided edge of which is connected through a hinge 5 to an elongated member 1 for hooking the rim 3 through a temple end 7 onto an ear and another sided edge of which is bridged through a bridge 4 to another rim 3 for enclosing another lens L. A still another sided edge of the rim 3 is connected through the supporting pad 2 for maintaining a distance between the lens L and an eye at an appropriate value, riding on a sidewall of a nose which is located in a center of a face. A place bar 11 is optionally added herein for connecting two rims 3 and 3 to each other, for instance, to reinforce the spectacles either mechanically or fashionably but it is of course unnecessary. Other components except for those mentioned above are quite similar to those described in the previous embodiment.

Similarly to the previous embodiment, the spectacles according to the present embodiment constitutes a displacement prevention mechanism K from a stretching spring member 1a, a compression spring member 1b and a supporting pad 2 formed of a soft-type material having a large friction coefficient to be capable of preventing the spectacles from displacing out of in front of eyes along the face during movement.

Operations and functions of the present embodiment are quite similar to those described in FIGS. 1A and 1B. However, the rigidity and the toughness of the spectacles according to the present embodiment are superior to those described in the previous embodiment because the present embodiment has excessively the rims 3 and the place bar 11 compared with the previous one. Accordingly, a control range of the tensile force Fa and the compression force Fb according to the latter is a little wider than that of the former.

In the embodiments according to the present invention, the stretching spring member 1b is inserted between the hinge 5 and the elongated member 1 from the fashionability and the manufacturing technological points of view. The location whereto the stretching spring member 1b is inserted is not limited to there but variable, for instance, such as between the elongated members 1 and the temple end 7 or between the hinge 5 and the lens L (or the rim 3).

As mentioned above, the technologies according to the present invention wherein the spectacle is built-in with the stretching spring member, the compressible spring member and the supporting pad having the large friction coefficient as the nose pad to constitute the displacement prevention mechanism have the effectiveness that the displacement of the spectacle is actually preventable during playing the sports.

What is claimed is:

1. A spectacle to be put on in front of an eye on a face, comprising:

a lens;

an elongated member for hooking said lens through an temple end on an ear which is located on a sidewall of a head;

a supporting pad for maintaining a distance from said lens to said eye;

a first spring member for generating a tensile force; and a second spring member for generating a compressible force, wherein:

said first spring member and said second spring member connected to said spectacle such that said compressible force applied through said supporting pad onto said face and said tensile force work cooperatively in a back-and-forth direction when said spectacle is in use; and said supporting pad for contacting with a nose on a sidewall is formed of a soft-type material having a large friction coefficient to constitute a displacement prevention mechanism, thereby enabling to prevent said spectacle from displacing out of in front of said eye.

2. The spectacle according to claim 1, wherein:

said first spring member is formed of a constituent of a group consisting of a coil spring member and a leaf spring member; and said first spring member being provided to be controllably mounted corresponding to a specified tensile force into a certain intermediate position from said lens to said temple end of said elongated member which hooks said lens onto said ear located on said sidewall of said head.

3. The spectacle according to claim 1, wherein:

said second spring member is formed of said constituent of said group consisting of said coil spring member and said leaf spring member; and said second spring member being provided between said lens and said supporting pad so that a distance from said sidewall of said nose located on a center of said face to said lens can be maintained at an adequate value.

4. A spectacle to be put on in front of an eye on a face, comprising:

a lens;

a rim for enclosing said lens;

an elongated member for hooking said rim-through a temple end onto an ear which is located on a sidewall of a head;

a supporting pad for maintaining a distance from said lens enclosed in said rim to said eye;

a first spring member for generating a tensile force; and a second spring member for generating a compressible force, wherein:

said first spring member and said second spring member are built-in into said spectacle so that said tensile force and said compressible force, the latter of which is applied through said supporting pad onto said face, work cooperatively in a back-and-forth direction when said spectacle is put on; and said supporting pad for contacting with a nose on a sidewall is formed of a soft-type material having a large friction coefficient to constitute a displacement prevention mechanism, thereby enabling to prevent said spectacle from displacing out of in front of said eye.

5. The spectacle according to claim 4, wherein:

said first spring member is formed of a constituent of a group consisting of a coil spring member and a leaf spring member; and said first spring member being provided to be controllably corresponding to a specified tensile force into a certain intermediate position from said rim to said temple end of said elongated member which hooks said rim for enclosing the lens on said ear located on said sidewall of said head.

6. The spectacle according to claim 4, wherein:

said second spring member is formed of said constituent of said group consisting of said coil spring member and said leaf spring member; and said second spring member being provided between said rim and said supporting pad so that a distance from said sidewall of said nose located on a center of said face to said rim can be maintained at an adequate value.

* * * * *